(12) United States Patent
Tarkoma

(10) Patent No.: US 7,995,480 B2
(45) Date of Patent: Aug. 9, 2011

(54) OFFLOADING CONTENT ROUTING COST FROM ROUTERS

(75) Inventor: Sasu Tarkoma, Espoo (FI)

(73) Assignee: Nokia Corporation, Espoo (FI)

( * ) Notice: Subject to any disclaimer, the term of this patent is extended or adjusted under 35 U.S.C. 154(b) by 63 days.

(21) Appl. No.: 12/342,444

(22) Filed: Dec. 23, 2008

(65) Prior Publication Data
US 2010/0158004 A1    Jun. 24, 2010

(51) Int. Cl.
*G01R 31/08* (2006.01)
(52) U.S. Cl. .................................... 370/237; 370/216
(58) Field of Classification Search .............. None
See application file for complete search history.

(56) References Cited

U.S. PATENT DOCUMENTS

| | | | |
|---|---|---|---|
| 7,031,321 B2* | 4/2006 | Habetha | 370/395.31 |
| 7,768,995 B2* | 8/2010 | Yang et al. | 370/351 |
| 2006/0291404 A1* | 12/2006 | Thubert et al. | 370/254 |

* cited by examiner

*Primary Examiner* — Robert W Wilson
(74) *Attorney, Agent, or Firm* — Ditthavong Mori & Steiner, P.C.

(57) ABSTRACT

Embodiments of the present invention are directed to reconfiguring communication routing architecture. A determination may be made that loading on one or more routing entities require adjustment. Adjustment may be required in situations where, for example, the amount of data to convey or the number of clients to service overcome the abilities of the router. In reconfiguring the communication routing architecture, some of the routing responsibility for the heavily loaded routers may be offloaded to neighboring routers and/or clients.

20 Claims, 5 Drawing Sheets

OFFLOADING CONTENT ROUTING COST FROM ROUTERS

BACKGROUND

1. Field of Invention

Various embodiments of the present invention relate generally to content-based routing, and more specifically, to reallocating burden in content-based routing.

2. Background

In the realm of electronic communication, routing is the act of forwarding information from source to destination via intermediary entities (e.g., routers). For example, constraints (also referred to as filters or subscriptions) may be used to make forwarding (routing) decisions for incoming messages (also referred to as publications) based on the information stored in the header or the content of the message. The router may interpret content in the header of packets in view of constraints, and forward the packet accordingly.

One example of such a system is a publish/subscribe (pub/sub) system. A publishers may publish events (messages) in a pub/sub system for subscribers that receive notifications (messages) regarding events that have occurred. Publishers may also be referred to as producers, sources or suppliers, while subscribers are also known as consumers or sinks. In pub/sub systems, routers are components tasked with the conveyance of communication between publishers and subscribers, and thus, mediate message transfer between them.

The integration of electronic communication functionality into an expanding number of applications has increased network size, complexity, etc. For example, not only will the number of subscriptions that must be maintained by each routing entity increase as more apparatuses are added to networks, but also the complexity of each subscription. This burden may prove computationally expensive for routers when making forwarding decisions.

SUMMARY

Example embodiments of the present invention may be directed to a method, apparatus and computer program for reconfiguring a communication routing architecture. A determination may be made that loading on one or more routing entities require adjustment. Adjustment may be required in situations where, for example, the amount of data to convey or the number of clients to service overcome the abilities of the router. In reconfiguring the communication routing architecture, some of the routing responsibility for the heavily loaded routers may be offloaded to neighboring routers and/or clients.

In accordance with at least one example embodiment of the present invention, reconfiguration may comprise redistributing some of the routing load by partitioning routing tables between clients and/or routers. The routing load may be distributed to other entities in the form of requests sent by the router based, for example, on local polices. These requests may comprise information needed to adjust routing such as routing table entries and fixed entries assigned by the router. If accepted, routing in the network may be reconfigured to offload at least the responsibilities included in the request. The reconfiguration may entrust routing duties to a sole entity, or alternatively, to a plurality of entities operating in parallel.

Various implementations of the present invention may operate in a centralized or decentralized manner by fixing a commonly agreed graph based data structure, which may be utilized to position actual routing table updates in the routing table. Routers may then provide the commonly agreed graph-based data structure, along with information related to how the updates correspond to the commonly agreed graph based data structure to clients and/or other neighboring routers for computation, thus reducing the computational load on the routers. In at least one example embodiment, entities receiving part of the routing responsibility may further offload computations to their clients and/or other routers.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

The disclosure will be further understood from the following description of various exemplary embodiments, taken in conjunction with appended drawings, in which.

DESCRIPTION OF EXEMPLARY EMBODIMENTS

Figure 1:
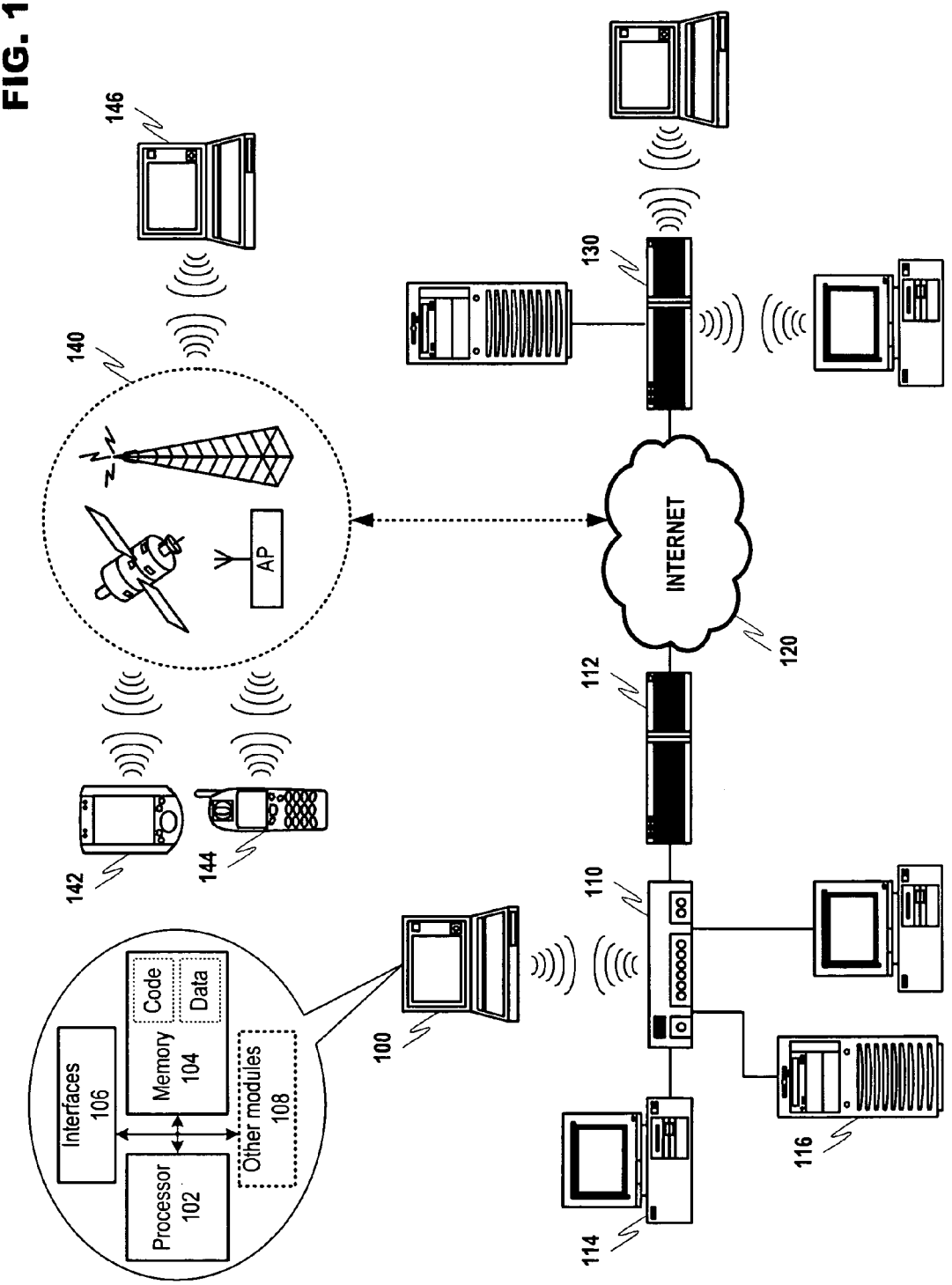
FIG. 1 discloses examples of hardware and software resources that may be utilized when implementing various embodiments of the present invention.

While the present invention has been described herein in terms of a multitude of example embodiments, various changes or alterations can be made therein without departing from the spirit and scope of the present invention, as set forth in the appended claims.

I. General System with which Embodiments of the Present Invention may be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions, wherein a group of instructions may be constituted, for example, as program code. In at least one scenario, the execution of program code may include receiving input information from other elements in computing device 100 in order to formulate an output (e.g., data, event, activity, etc). Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 100 may provide wired and/or wireless support to devices such as computer 114 and server 116. Hub 100 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

II. Example Networking Environment

In an example distributed networking environment, published events may be communicated in event messages, also referred to as notifications, using a message transport protocol. Further, various entities in distributed systems may utilize point-to-point messaging protocols, or alternatively, may also employ various multicast or broadcast protocols.

Effective and efficient routing may be achieved through the determination of optimal paths for routing messages. For example, routing protocols may be utilized to determine optimal routes for transporting messages through a network. Determination of optimal routing paths require one or more routing protocols to provide and update a routing table (or database) for each router in the network. A routing table or database may be stored locally in each router, and may define the current network topology. Routing in networks may be classified as dynamic or static, wherein static routing may utilize table mappings that may be entered by users (e.g., network administrator) prior to routing, and may only be changed by user input. Dynamic routing utilizes routing protocols that adapt to changing network conditions in response to incoming route update information. In response to the route update information, routes may be recalculated, routing update messages may be transmitted to neighboring routers, and routing tables (or databases) may be updated.

In order to maintain routing tables or databases, routers may transmit and receive updated network topology information. For example, such information may include routing update messages. By communicating with other routers in this manner, each router may maintain a locally stored routing table or database that defines the most current network topology. Entries may be added or removed from routing tables or databases by users (e.g., network administrators) in the case of static routes, or by various dynamic routing protocols. The routing table may define a mapping from destination address to logical (output) interface, enabling the router to forward messages along the optimal path toward their destination.

In content-based routing facilitated by filtering, routing tables may contain a set of filters corresponding to each interface and local client. Filtering allows subscribing entities to specify their interest in advance, and thus, reduce the number of event messages that they will receive. A filter, or set of filters, that describe desired content may be included with subscription messages. Filters may also be used to advertise the future publication of events. In content-based routing, the entire content of the event message may be filterable.

Figure 2:
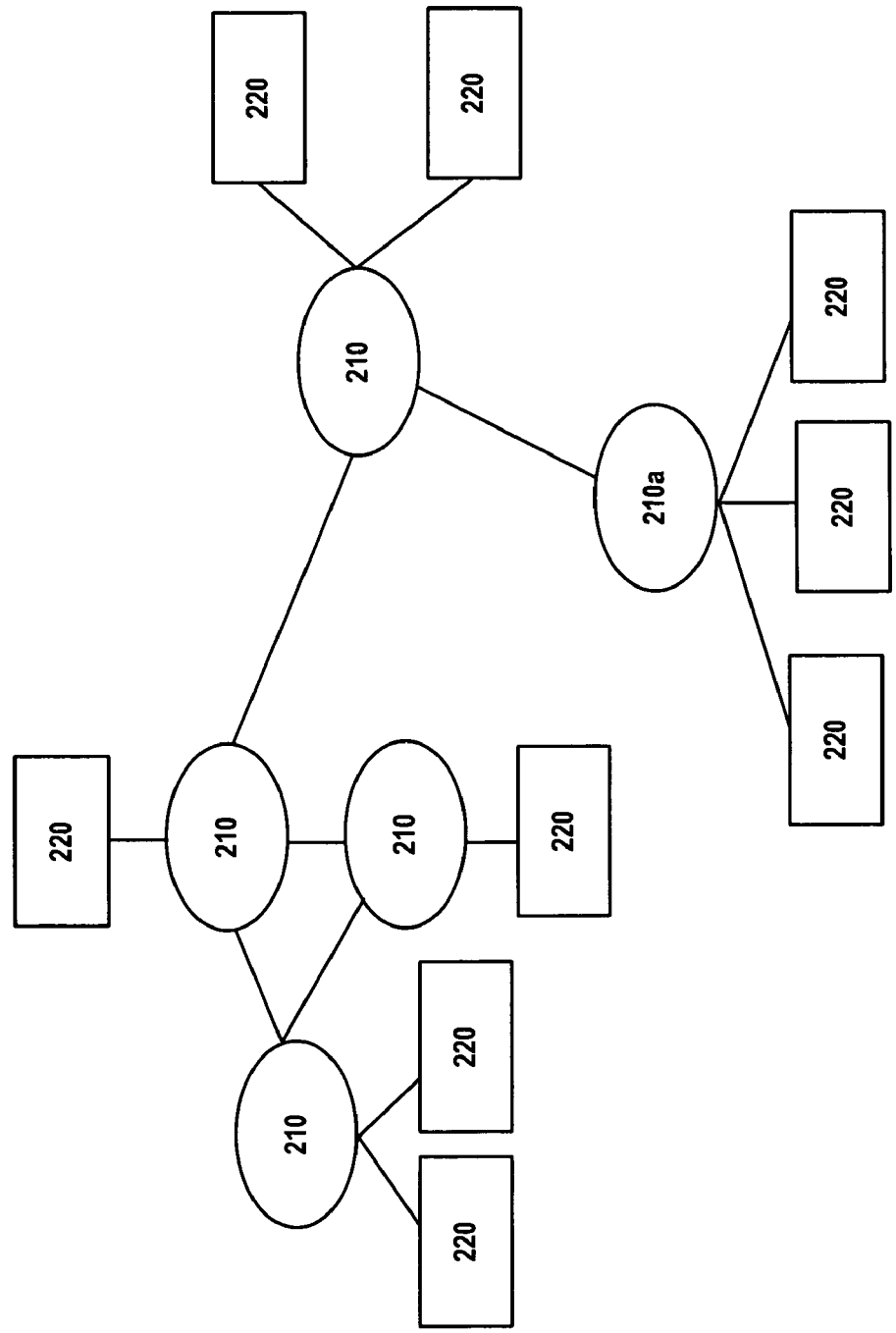
FIG. 2 discloses an example network environment in accordance with at least one embodiment of the present invention.

In accordance with at least one example embodiment of the present invention, a distributed networking environment in which event messages may be routed based on the content of the message is disclosed in FIG. 2. Initially, it is important to understand that while an example hardware based network has been used for the sake of explanation herein, various embodiments of the present invention may be implemented in any message routing application. FIG. 2 discloses an exemplary network 200, which includes a plurality of event routers 210 connected to each other through bi-directional links. An event router 210 may include a set of connections to neighboring routers and a set of connections to local clients 220. Neighboring routers may also be referred to as interfaces or destinations. Client 220, which may be a computing unit such as a PC, smart phone, etc., may request to receive messages whose content meets a certain criteria. On the other hand, event routers 210 may forward messages to local clients 220 or other routers. For the sake of explanation, local clients 220 will be collectively referred to as clients 220 and event routers 210 will be collectively referred to as routers 210. Routers that are connected to only a single neighboring router, such as router 110a, may be referred to as edge routers or border routers.

Network 200 may also include other computing nodes, processors, systems, etc., that may be coupled to one another via links. Links may include, for example, TCP/IP connections over telephone or cable lines. Routers 210 and clients 220 may further comprise at least one processor, memory and communication interface (not shown). Processors may be utilized at least for computing relations (e.g., by performing comparisons) between incoming routing table updates and current routing tables stored locally in each network entity in order to process routing table updates accordingly (e.g., adding or deleting entries from the routing table). Routers 210 may store at least a routing table and/or database on local memory.

III. Examples of Network Reconfiguration

Both sets of connections (e.g., with neighboring routers and to local clients) may be associated with routing tables or databases. Routing tables may store, for example the routes (and metrics associated with those routes) to particular network destinations. The routing table may list, for all reachable destinations, the address of the next device along the path to that destination (e.g., the next hop). The routing table may include information fields for storing, for example, the network ID (e.g., destination network ID), cost (e.g., the impact on throughput of the proposed message path), the next hop, etc. Additionally, routing tables may also include information fields for storing, for example, quality of service associated with a particular route. Routing tables may be implemented as graph-based data structures such as, for example, structures such as directed acyclic graphs (DAG) or "forests."

Figure 3:
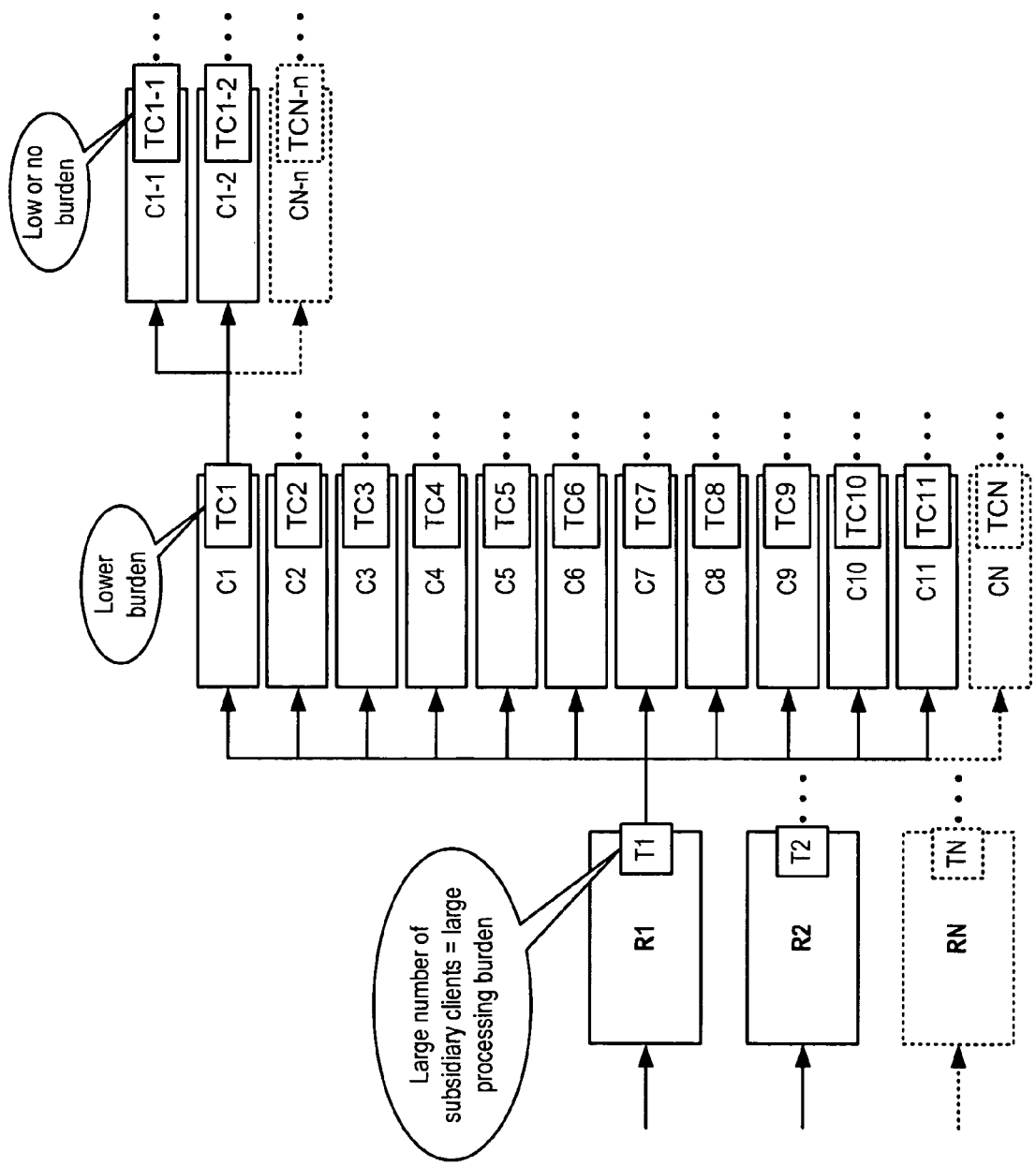
FIG. 3 discloses example throughput problems that may be addressed or alleviated through implementation of various embodiments of the present invention.

An example network topology is disclosed in FIG. 3. A plurality of routers R1-RN may each be configured to route information to one or more clients. In FIG. 3 clients C1-CN may subscribe to information that is provided through router R1, and therefore, each client C1-CN is situated downstream of router R1. The relationship between router R1 and clients C1-CN is a portion of the total network topology that is contained in routing table T1. Further, it is also possible for each client C1-CN of router R1 to have further clients C1-1 to CN-n, this portion of the network topolology to C1 being set forth in mapping table TC1-TCn. Further mappings (e.g., TC1-1 to TC1-$n$) may correspond to any subsequent clients.

In the example of FIG. 3, the large number of clients that must be serviced by router R1, in particular at least C1-CN and C1-1 to C1-$n$, may overwhelm router R1. The burden may be especially large in situations where there is a large amount of data to be conveyed or the required speed of transaction is high. Regardless of the routing burden seen by router R1, the burden on clients C1-CN will be lower since client C1 has fewer clients to service. Likewise, subsequent clients like C1-1 will have even lower routing burden, or in the case where a client is the terminal client (last client) there may be no routing burden.

In accordance with the example scenario of FIG. 3, it may not be feasible to expect a single publisher or router to be able to filter all event messages as the number of network enabled devices (e.g., subscribers) increase. In particular, the number of event messages (e.g., publications) waiting to be routed to clients, in accordance with subscriptions set forth in the router, may grow to the point that the router becomes overwhelmed, which may negatively impact the overall quality of service for the network.

In accordance with an exemplary embodiment, when a router receives an incoming routing table update, instead of processing the update locally, the router may partition the routing table update and/or the routing table, and transfer the processing tasks to neighboring routers and/or clients. Now referring to FIG. 4, the router may transmit a computation request for routing table information to one or more neighboring routers and/or clients (step 200). Routing tables T1* and TC1*-TC3" represent an example of offloading routing burden from a router to clients. In the disclosed situation, routing table T1 may be partitioned and some of the routing responsibility may be allocated to clients C1-C3. Clients C1 and C2 may operate in parallel (as indicated at 400). In parallel operation, clients C1 and C2 may be allocated identical portions of the original routing table T1. Such a configuration may be utilized to service particular clients when, for example, there is a substantial amount of information to convey to certain subscriptions. Not only does this configuration allow for higher information throughput, but it also may provide error checking when configured as such (e.g., the routing of the same information by C1 and C2 may be compared for accuracy).

Figure 4:
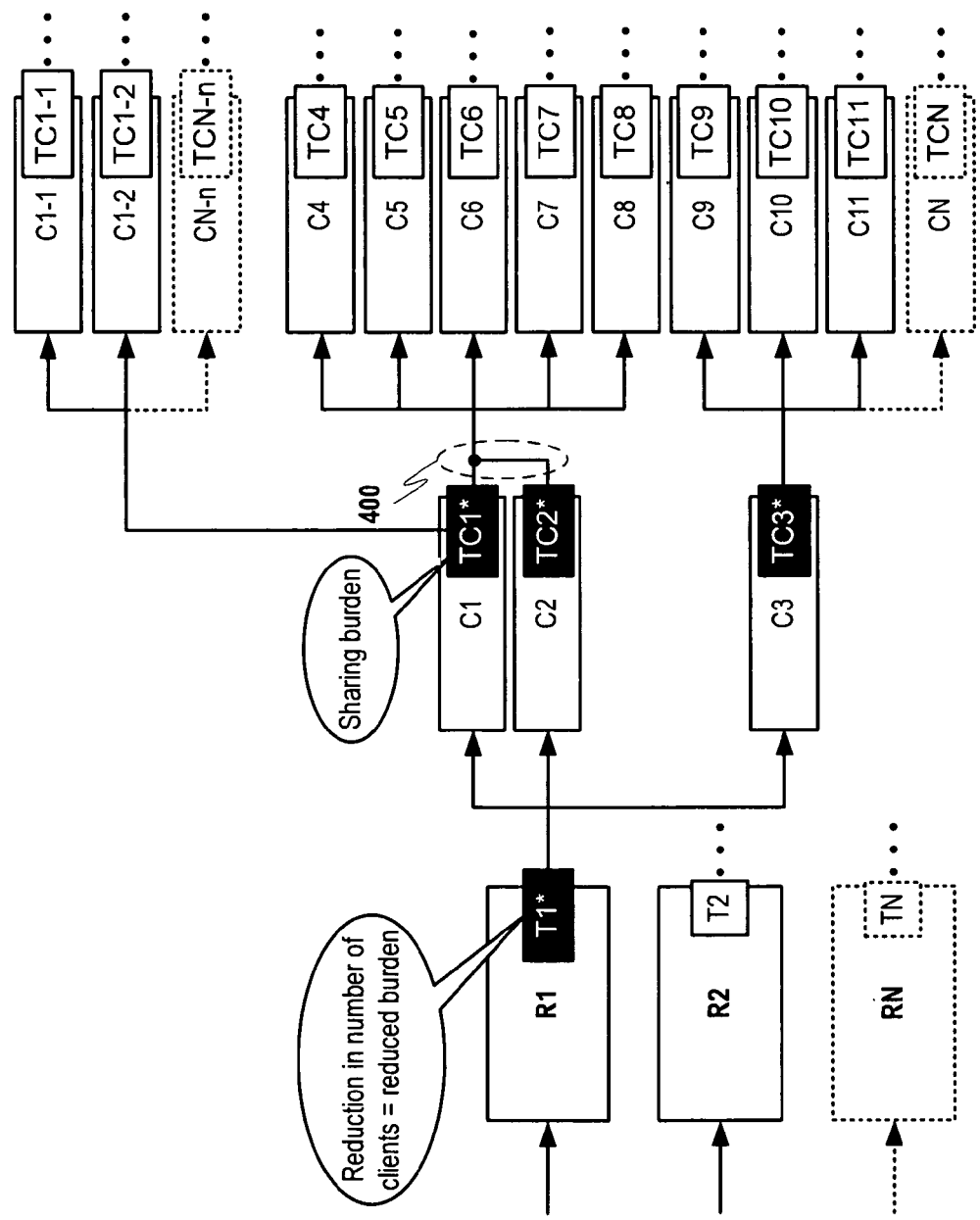
FIG. 4 discloses the example of FIG. 3 configured to offload routing onto other routers/clients in accordance with at least one embodiment of the present invention.

While C1 and C2 may be configured to operate in parallel in FIG. 4, this does not imply that routing table TC1* and TC2* will be identical. C1 already had clients C1-1 to C1-$n$ that must continue to be serviced. In order to avoid pushing the routing problems to clients, thereby causing clients become slow or uncooperative, various example embodiments of the present invention may recompute relationships so that subscriptions native to a client may be positioned with the routing information being allocated from the router so that the burden taken on by the client and the client's existing subscriptions may operate seamlessly.

Further in FIG. 4, client C3 may take over a portion of routing table T1 from R1 that addresses subscriptions different subscriptions (e.g., in TC3*) from C1 and C2. The acceptance of requests by clients C1-C3 may be reported back to R1, which may then adjust operation to handle the routing defined in routing table T1*. As a result of this operation, at least some of the routing burden may be removed from R1 and reallocated to be handled by clients C1-C3. The fact that clients C1-C2 and C3 handle different subscriptions may result in more balanced operation, as this reallocation divides the number of subsequent clients so that no routing entity is charged with servicing a substantial amount of subscriptions.

IV. Example Process

Figure 5:
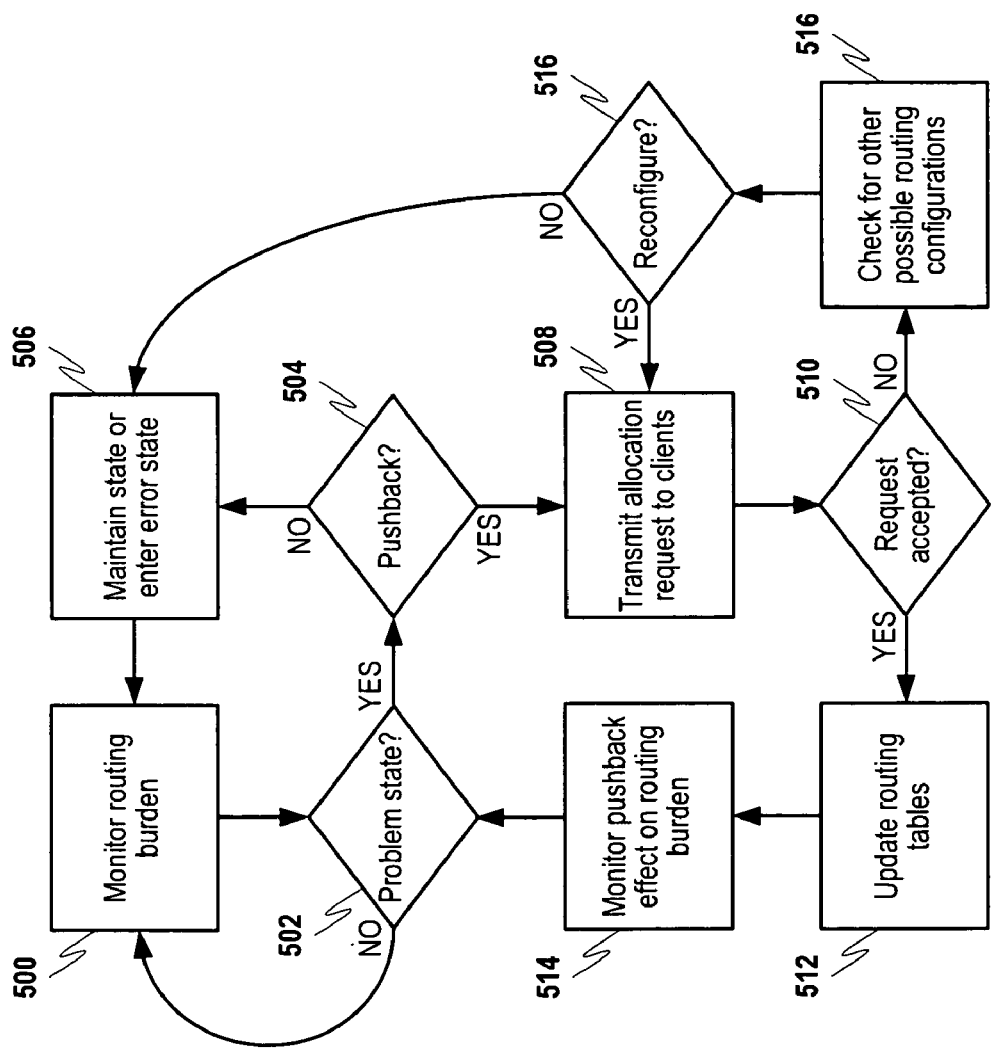
FIG. 5 discloses a flowchart for an example process of offloading routing to routers/clients in accordance with at least one embodiment of the present invention.

A flowchart of an example process usable with various embodiments of the present invention is now disclosed with respect to FIG. 5. Routing in the network may be monitored in step 500 until a condition requiring reconfiguration is recognized in step 502. A determination may then be made in step 504 as to whether routing in one or more network entities may be reallocated by pushing them to clients or other routers. If pushback is not possible, for example, because no network entities are identified that are able to handle the additional routing burden, or that will accept the burden, then in step 506 the current state of operation may be maintained. Maintaining the current state of operation may allow network communication to continue, however, the overall quality of service in the network may be negatively impacted. In accordance with at least one embodiment of the present invention, it is also possible for the network system to enter an error state in step 506 wherein alarming related to the situation or other corrective actions make take place in view of the routing load. The process may then return to step 500 to continue monitoring network routing operations.

If in step 504 a determination is made that reallocation (e.g., pushback) is possible, then in step 508 one or more routers may transmit requests for reallocation to clients and/ or other routers. Requests for reallocation to clients and/or other routers may include at least a set of routing table entries and a set of fixed entries assigned by the router. The one or more entities that receive the computation request (e.g., neighboring routers and/or clients) may process the update and transmit the results of the computation back to the router that sent the computation request. If the request is accepted in step 510, then the routing tables in the clients and/or other routers may be updated. The router may then receive routing table information from the one or more entities in response to the computation request. The received routing table information may include a graph based data structure (e.g., a DAG or forest) describing relationships between the routing table entries and the relationships between the routing table entries and the fixed entries. The one or more neighboring routers and/or clients may compute the relationships by iterating over the entries and performing comparisons between the entries. It should be noted that the router may assign the same set or overlapping sets of routing table entries for processing to multiple clients and/or routers to verify that the received results are correct. The router may update its routing table based on the received routing table information by positioning the received routing table information in the routing table in accordance with the fixed entries. Monitoring the reconfigured network may then occur in step 514 until a condition requiring reconfiguration is observed in step 502.

If in step 510 the request to the clients or other routers is rejected, then in step 516 further evaluation of other possible configurations (e.g., reallocating routing burden different clients or servers) may occur. If in step 518 another configuration is determined to be possible, then the process may return to step 508 wherein reallocation requests are sent to the clients and/or routers in accordance with alternative configuration. If no alternative routing configuration is determined in steps 516-518, then the current network operational state may be maintained, or alternatively, the network may enter an error state in step 506.

The flow chart disclosed in FIG. 5 is but one example of dividing the routing table and an incoming routing table update for processing by neighboring routers and/or clients. For instance, the router may utilize a layered approach in which the routing table (implemented as a DAG, forest, etc.) is processed starting from layer-0 (root) towards the successors. Filters may be grouped into a large vector and for each of the K neighboring routers and/or clients, N filters may be assigned to the neighboring routers and/or clients from the vector along with the input set. The neighboring routers and/or clients may compute the relations between the two sets (e.g., the input set and the assigned filters) and return the results in the form of a graph based data structure (e.g., DAG or forest). The router may then perform the update based on the received results, thus eliminating the need for the router to compute the relations, thereby reducing the processing load on the router.

In an alternative embodiment, neighboring routers and/or clients may receive a set of fixed routing table entries that are expected to represent the static interests in a certain space. The filters issued by the neighboring routers and/or clients may be positioned within this set of fixed entries by computing the necessary relations. The router may then utilize the relations computed by the neighboring routers and/or clients to properly update its routing table. Similarly, neighboring routers may utilize the above-described process to reduce their processing load. In one example, the routers may share a static set of filters, which may be used to position filters. Where there is no previously known global structure, the routers may try to model their neighboring routers and try to anticipate their demands based on the routing table updates they have received. With this model, routers may provide reference data (in the form of fixed entries) that may be used by the neighboring routers to reduce processing load.

The exemplary processes disclosed herein may be embodied in an article of manufacture (e.g., one or more computer program products) having, for example, computer executable program code recorded on computer readable media. The computer readable program code may cause a computer (or processor) to execute the exemplary process.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    determining to transmit a request for routing table information to one or more apparatuses, the request comprising one or more routing table entries and a set of one or more fixed entries;
    receiving routing table information from the one or more apparatuses in response to the request, the routing table information comprising a graph based data structure describing relationships between the one or more routing table entries and relationships between the one or more routing table entries and the one or more fixed entries, wherein the relationships are formulated based on one or more burdens associated with the one or more routing table entries, the one or more fixed entries, or a combination thereof, performed in the one or more apparatuses; and
    determining to update a routing table based on the received routing table information.

2. The method according to claim 1, wherein the one or more apparatuses include routers or clients.

3. The method according to claim 1, wherein the graph based data structure is a directed acyclic graph (DAG) or a forest.

4. The method according to claim 1, wherein updating the routing table includes updating the routing table based on the received routing table information according to the one or more fixed entries.

5. The method according to claim 1, wherein the routing table is a directed acyclic graph (DAG) or forest.

6. The method according to claim 1, wherein at least one of the one or more fixed entries is a client that one of the one or more apparatuses is charged with servicing.

7. The method according to claim 1, wherein the burden is based, at least in part, on a number of subscriptions, a complexity of each subscription, a computational burden, or a combination thereof, of the one or more apparatuses.

8. An apparatus, comprising:
    at least one processor; and
    at least one memory including computer program code for one or more programs,
    the at least one memory and the computer program code configured to, with the at least one processor, cause the apparatus to perform at least the following,
        determine to transmit a request for routing table information to one or more apparatuses, the request comprising one or more routing table entries and one or more fixed entries;
        receive routing table information from the one or more apparatuses in response to the request, the routing table information comprising a graph based data structure describing relationships between the one or more routing table entries and relationships between the one or more routing table entries and the one or more fixed entries, wherein the relationships are formulated by comparisons of one or more burdens associated with the one or more routing table entries, the one or more fixed entries, or a combination thereof, performed in the one or more apparatuses; and determine to update the routing table based on the received routing table information.

9. The apparatus according to claim 8, wherein the graph based data structure is a directed acyclic graph (DAG) or a forest.

10. The apparatus according to claim 8, wherein the apparatus is further caused to: update the routing table based on the received routing table information according to the one or more fixed entries.

11. The apparatus according to claim 8, wherein the routing table is a directed acyclic graph (DAG) or forest.

12. A non-transitory computer-readable storage medium carrying one or more sequences of one or more instructions which, when executed by one or more processors, cause an apparatus to at least perform the following steps: comprising computer executable program code recorded on a computer readable medium, determining to transmit a request for routing table information to one or more apparatuses, the request comprising one or more routing table entries and one or more fixed entries;

receiving routing table information from the one or more apparatuses in response to the request, the routing table information comprising a graph based data structure describing relationships between the one or more routing table entries and relationships between the one or more routing table entries and the one or more fixed entries, wherein the relationships are formulated by comparisons of one or more burdens associated with the one or more routing table entries, the one or more fixed entries, or a combination thereof, performed in the one or more apparatuses; and determining to update a routing table based on the received routing table information.

13. The non-transitory computer-readable storage medium according to claim 12, wherein the one or more apparatuses include routers or clients.

14. The non-transitory computer-readable storage medium according to claim 12, wherein the graph based data structure is a directed acyclic graph (DAG) or a forest.

15. The non-transitory computer-readable storage medium according to claim 12, wherein the apparatus is caused to further perform: updating the routing table based on the received routing table information according to the one or more fixed entries.

16. The non-transitory computer-readable storage medium according to claim 12, wherein the routing table is a directed acyclic graph (DAG) or forest.

17. A method, comprising:

receiving a request from a router for routing table information, the request comprising one or more routing table entries and one or more fixed entries; and determining to transmit routing table information to the router in response to the request, the routing table information comprising a graph based data structure describing relationships between the one or more routing table entries and relationships between the one or more routing table entries and the one or more fixed entries, wherein the relationships are formulated by performing comparisons of one or more burdens associated with the one or more routing table entries, the one or more fixed entries, or a combination thereof.

18. The method according to claim 17, wherein the graph based data structure is a directed acyclic graph (DAG) or a forest.

19. An apparatus, comprising:

at least one processor; and at least one memory including computer program code for one or more programs, the at least one memory and the computer program code configured to, with the at least one processor, cause the apparatus to perform at least the following, receive a request from a router for routing table information, the request comprising one or more routing table entries and one or more fixed entries; and determine to transmit routing table information to the router in response to the request, the routing table information comprising a graph based data structure describing relationships between the one or more routing table entries and relationships between the one or more routing table entries and the one or more fixed entries, wherein the relationships are formulated by performing comparisons of one or more burdens associated with the one or more routing table entries, the one or more fixed entries, or a combination thereof.

20. A non-transitory computer-readable storage medium carrying one or more sequences of one or more instructions which, when executed by one or more processors, cause an apparatus to at least perform the following steps:

receiving a request from a router for routing table information, the request comprising one or more routing table entries and one or more fixed entries; and determining to transmit routing table information to the router in response to the request, the routing table information comprising a graph based data structure describing relationships between the one or more routing table entries and relationships between the one or more routing table entries and the one or more fixed entries, wherein the relationships are formulated by performing comparisons of one or more burdens associated with the one or more routing table entries, the one or more fixed entries, or a combination thereof.

* * * * *